United States Patent [19]

Aggeler

[11] Patent Number: 4,510,542
[45] Date of Patent: Apr. 9, 1985

[54] METHOD AND APPARATUS FOR HANDLING MAGNETIC RECORDING DISKS

[75] Inventor: Michael J. Aggeler, Byron, Calif.

[73] Assignee: Texor Corporation, Mountain View, Calif.

[21] Appl. No.: 452,276

[22] Filed: Dec. 22, 1982

[51] Int. Cl.³ .............................................. G11B 17/10
[52] U.S. Cl. ...................................................... 360/98
[58] Field of Search ............................. 360/98, 99, 71; 369/180, 191, 201, 202

[56] References Cited

U.S. PATENT DOCUMENTS

| | | | |
|---|---|---|---|
| 3,846,836 | 11/1974 | Masse et al. | 360/98 |
| 4,170,031 | 10/1979 | Beuch et al. | 360/98 |
| 4,173,427 | 11/1979 | Beuch et al. | 360/98 |
| 4,195,321 | 3/1980 | Chelin et al. | 360/98 |

Primary Examiner—Robert S. Tupper
Attorney, Agent, or Firm—Townsend and Townsend

[57] ABSTRACT

Apparatus and a method for handling magnetic recording disks of the type known as floppy disks rotatably mounted in envelopes. The apparatus comprises a bin for receiving a stack of disks and means for moving the lowermost disks one-by-one out of the stack and laterally of the bin to a first location at which one or more functions are performed with the disk, such as rotating the disks and writing data on the disks as they rotate. The disk at the first location is pulled into a second location beneath the bin, and the disk is allowed to gravitate from the second location onto a pivotal selector plate which transfers the disk into either of two collector locations. The aforesaid steps are repeated until all the supply of disks in the bin has been depleted.

14 Claims, 10 Drawing Figures

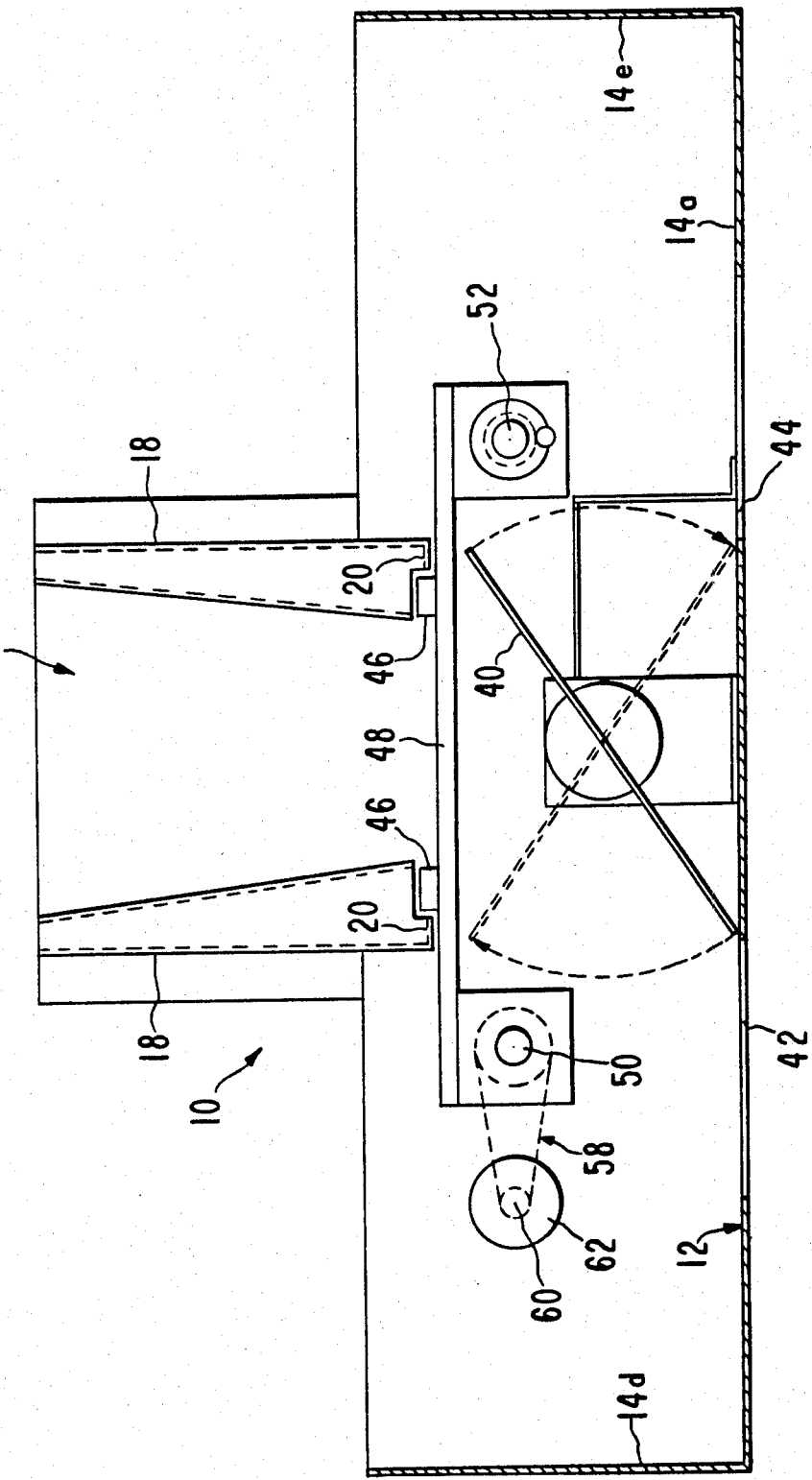

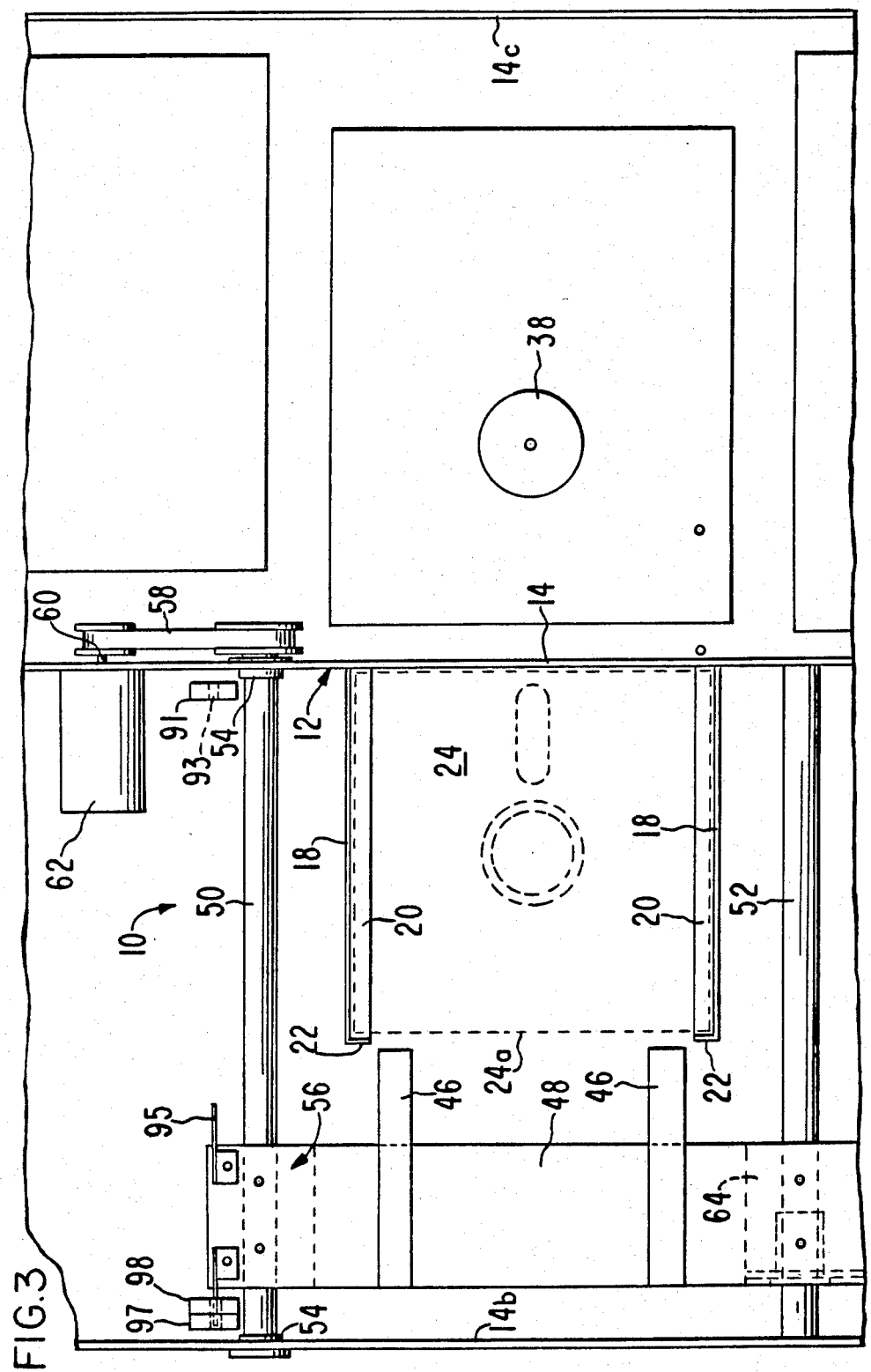

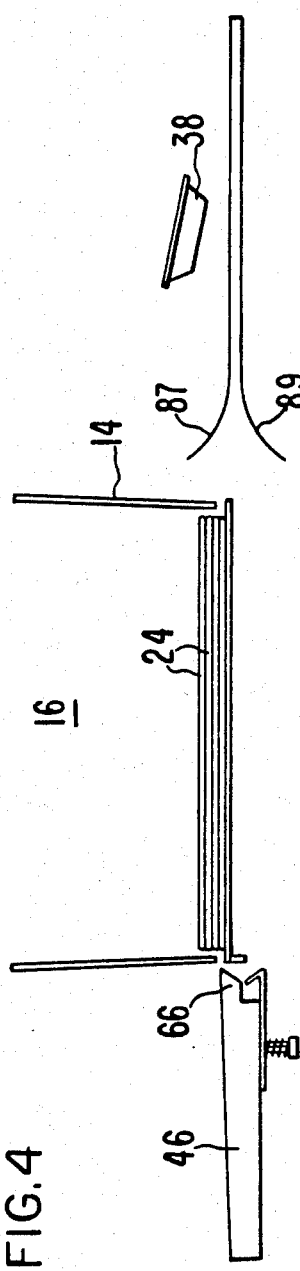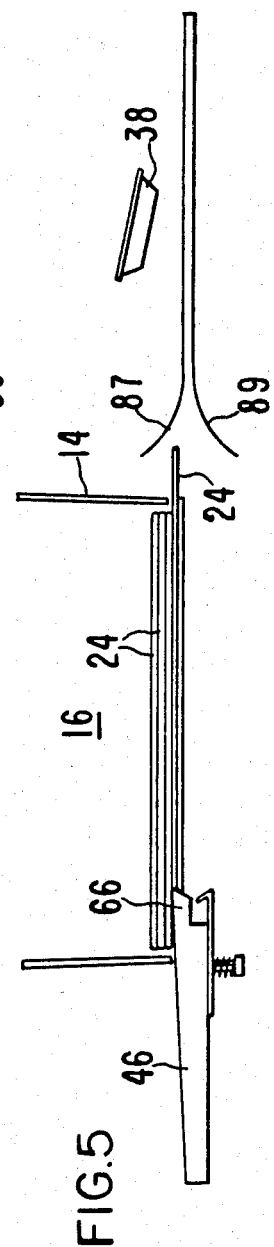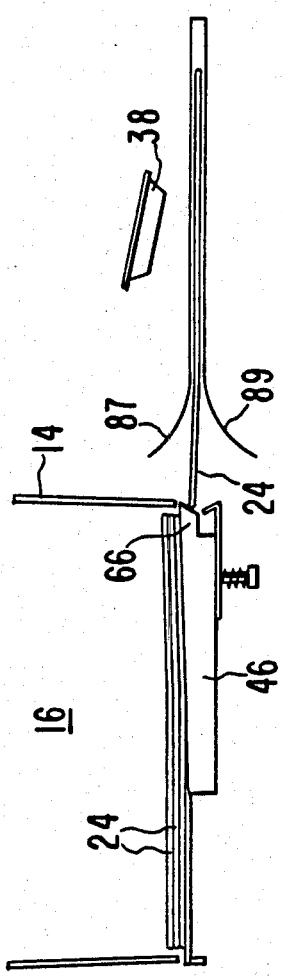

METHOD AND APPARATUS FOR HANDLING MAGNETIC RECORDING DISKS

This invention relates to improvements in the handling of magnetic recording disks and, more particularly, to apparatus and a method for handling each of a plurality of stacked disks.

BACKGROUND OF THE INVENTION

In writing information on a plurality of magnetic recording disks, it is a tedious and time-consuming job to manually pick up each individual disk, put it on a disk drive means, operate the drive means and write electronics to write the information onto the disk, then stop the drive means to manually remove the disk and replace it with another. The time and expense involved in repeating these steps for a large number of disks suggest that it would be very desirable if these steps could be done without operator attention. It is the purpose of the present invention to provide apparatus and method for performing these steps automatically and without requiring operator attention except for keeping a supply of disks in readiness to be handled. While the present invention is especially suitable for use in copying information on a plurality of magnetic recording disks, it is to be understood that the invention is also suitable for a wide variety of other applications, such as testing the disks, reading from the disks, and other functions which can be performed on or with the disks.

SUMMARY OF THE INVENTION

The apparatus and method of the present invention operates to move only the lowermost disk of a stack of disks off the stack and laterally to a first location at which the disk can be rotated for writing information on the disk or for other purposes. The apparatus include one or more shiftable fingers which engage the lowermost disk and move it laterally and off the stack. Each of the fingers has a pair of jaws such that, near the end of the path of travel of the fingers, the jaws grasp the envelope of the disk. Thus, following the writing or other function performed on or with the disk, the disk itself can be pulled by the fingers back to a second location beneath the stack and then allowed to separate from the fingers and to gravitate onto a pivotal selector plate. The disk is directed by the selector plate into one of two collector stations determined by the position of the selector plate. This setting of this position depends upon the results achieved during the performance of the writing or other function on the disk at the lateral station. For instance, if the writing of information is done properly, the disk is directed by the selector plate into a first collection station. If the disk is defective for one or more reasons, the disk is directed into the other collection station.

The aforesaid steps are repeated for each of the handled disks of the stack until all of the disks of the stack have been handled in the same manner. The present invention, therefore, lends itself to automatic operation, the only requirement being that a supply of disks be maintained in the stack so long as the apparatus to operate.

The apparatus is highly reliable, is simple and rugged in construction, and operates for long periods of times without operator attention. The apparatus is also expensive to produce and maintain and requires a minimum of space yet the apparatus can be used for a number of different functions involving magnetic recording disks.

The primary object of the present invention is to provide an improved apparatus and method for handling of a plurality of magnetic disks wherein a stack of such disks are fed one-by-one off the bottom of the stack to a first location laterally of the stack at which each disk can be rotated, supported or subjected to some other restrain yet each disk will be returned to a second location below the stack and then directed into a collection station, all of which can be accomplished automatically and in a minimum of time without operator attention.

Another object of the present invention is to provide an apparatus and method of the type described wherein the apparatus is simple and rugged in construction, is highly reliable and is inexpensive to produce and maintain, and provides a means for performing any one of a number of different functions on magnetic recording disks to eliminate the time and involved in manually handling the disks as is conventionally done at the present time.

Other objects of this invention will become apparent as the following specification progresses, reference being had to the accompanying drawings for an illustration of the invention.

In the Drawings

FIG. 2 is a schematic, vertical elevational view of the bin and a pivotal selector plate below the stack of disks for directing a disk into one of two collection stations after the disk has been returned to a second location below the bin;

FIG. 3 is a schematic, top plan view of the apparatus; and

FIGS. 4–10 are schematic side views of the apparatus, showing the sequential steps in the removal of disks one-by-one from the bottom of the stack and for moving the disks laterally of the stack into and out of the first location and into the second location for gravitation into one of the two collection stations.

Figure 1:
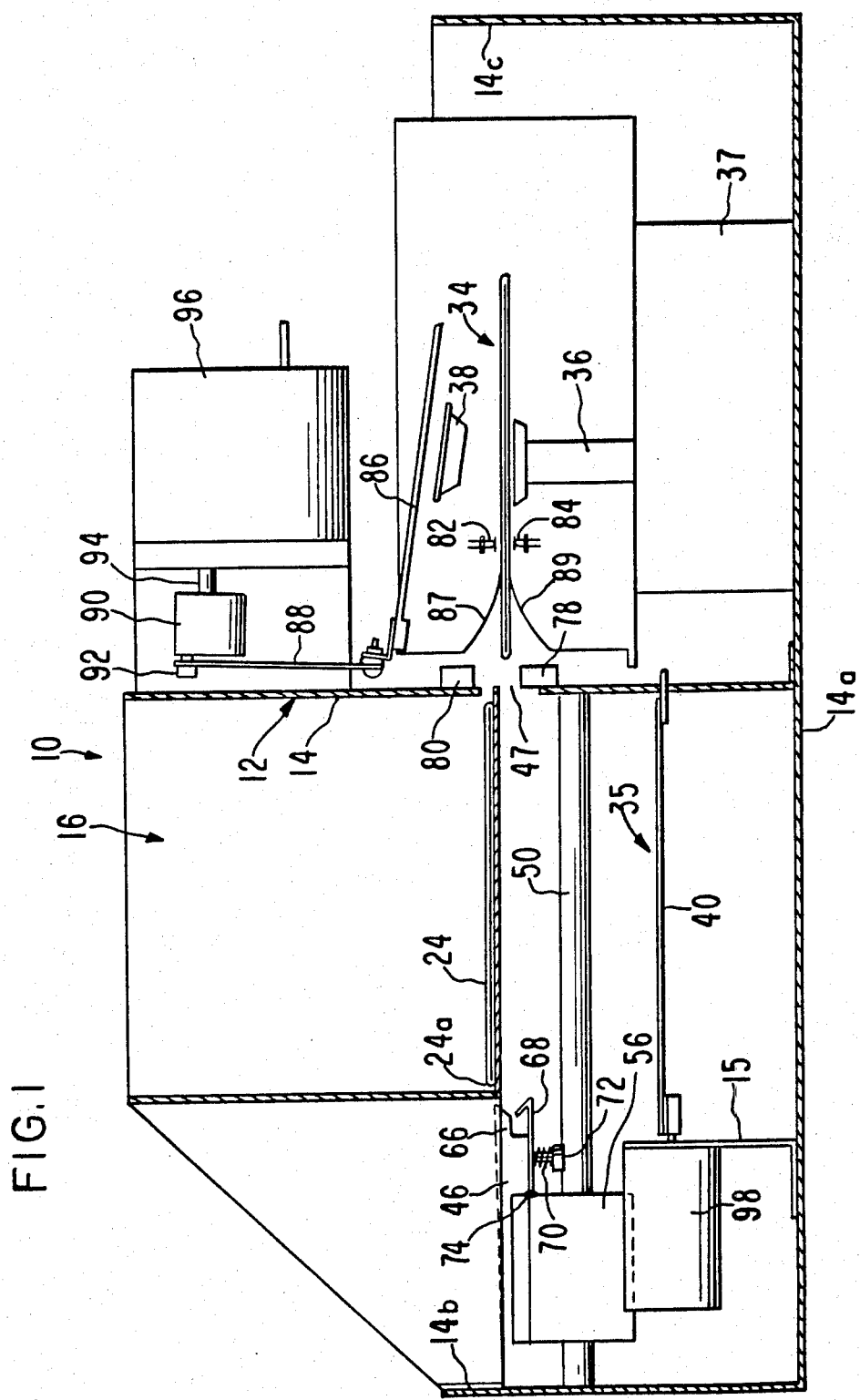
FIG. 1 is a vertical section, partly schematic, of the disk handling apparatus of the present invention, showing a stack of disks in a bin for movement off the bottom of the stack one-by-one to a first location laterally spaced from the bin.

The disks handling apparatus of the present invention is broadly denoted by the numeral 10 and includes a fixed support 12 on which the varied fixed and moving parts of the system are mounted. For purposes of illustrating the teachings of the present invention, support 12 will be shown in FIG. 3 as being comprised of a generally vertical central wall 14, a base or bottom wall 14a, a pair of spaced end walls 14v and 14c (FIG. 1) and a pair of spaced side walls 14d and 14e (FIG. 2).

A bin 16 (FIGS. 1 and 2) is adjacent to central wall 14, the bin being formed by a pair of generally vertical side panels 18 which are spaced apart as shown in FIG. 1 and are secured in any suitable manner, such as by brackets (not shown) to wall 14. Panels 18 extend laterally from wall 14 as shown in FIG. 3, each panel 18 having a lower flange 20 along the lower margin thereof and a vertical flange 22 near the rear, upright margin thereof (FIG. 3). Thus, a plurality of conventional disks or diskettes 24 can be mounted in bin 16 so that the lowermost disk rests on flanges 20 and is in proximity to the rear face of wall 14 and the front faces of flanges 22. The stack of disks 24 is shown in dashed lines in FIG. 3, it being understood that the term "disk" or "diskette" means a floppy disk mounted within an envelope in a manner such that the disk can rotate relative to the envelope. The disks can be of any diameter, typically the diameter being 5¼ inches. Each disk in an envelope has a central hole which is adapted to be mounted on a spindle to cause rotation of the disk relative to the envelope.

While apparatus 10 can be used in a number of different ways in the handling of disks 24, the apparatus can be used for causing information to be written onto the disks individually. To this end, the lowermost disk of the stack is moved laterally of the bin 16 to a first location broadly denoted by the numeral 34 (FIGS. 1 and 3). At location 34, the disk 24 will be mounted on a spindle 36 (FIG. 1) by the downward movement of a collet 38 which moves the disk 24 into driving relationship with the spindle. Spindle 36 is coupled to a motor 37 and rotated thereby. The disk is rotated by the spindle and information can be written onto the disk itself, following which the rotation of the spindle is stopped, collet 38 is lifted, and the disk 24 is returned to a second location (FIG. 1) below the bin 16. Then, the disk is allowed to gravitate onto a pivotal selector plate 40 which is angled to deflect the disk toward one of two collection stations. Thus, the disk will gravitate into and through one of two openings 42 and 44 (FIG. 2).

Means is provided near the lowermost disk 24 of the stack for moving the disk out of the stack and laterally into first location 34. Such means, for purposes of illustration, includes a pair of spaced, generally parallel fingers 46 which are secured to a shiftable bar member 48 (FIGS. 2 and 3). Member 48 is spans the distance between a pair of generally parallel, horizontal carrier shafts 50 and 52, shaft 52 being rigid at its ends to walls 14 and 14b (FIG. 3). Carrier shaft 50 is rotatably mounted by bearings 54 at its ends on walls 14 and 14b, and carrier shaft 50 has a conventional linear actuator 56 for coupling it to bar member 48. By rotating shaft 50 in opposite directions, bar member 48 is moved linearly along shafts 50 and 52 back and forth. A suitable linear actuator for this purpose is one known as Rohlix made by Zerobase Corporation of Minneapolis, Minn.

A belt and pulley assembly 58 is coupled to one end of shaft 50 near wall 14, and assembly 58 is coupled to the drive shaft 60 of a reversible drive motor 62 mounted in any suitable manner on wall 14 as shown in FIG. 3. Upon actuation of drive motor 62 for rotating shaft 60 in one direction, carrier shaft 50 is rotated to, in turn, cause linear movement of bar member 48 to the right when viewing FIG. 3, it being understood that the opposite end of member 48 is provided with a bushing 64 which is in sliding relationship to the outer surface of carrier shaft 52. As member 48 moves to the right when viewing FIG. 3, the fingers 46 engage the lowermost disk 24 in bin 16 and push the disk through an opening 47 (FIG. 1) in wall 14 into first location 34 (FIG. 1).

Each finger 46 has a pair of relatively shiftable parts 66 and 68 (FIG. 1) which define jaws which open as part 68 is pivoted away from part 66 against the bias force of a spring 70 carried on a shoulder screw 72 threaded into part 66 as shown in FIG. 1. The pivot point of part 68 is denoted by the numeral 74.

Part 66 of finger 46 is above part 68 as shown in FIG. 1, and part 68 is only high enough to engage the rear edge 24a (FIGS. 1 and 3) of the lowermost disk 24, the fingers 46 being engageable with the lowermost disk by virtue of the open rear end of the bin as shown in FIG. 3. As the fingers 46 move to the right when viewing FIG. 1, they push the lowermost disk 24 laterally over the upper surfaces of flanges 20 (FIG. 3) and out of the bin through opening 47 (FIG. 1) in wall 14. The other disks in the stack remain in the bin. A pair of guides 87 and 89 (FIG. 1) aligned laterally with opening 47 in central wall 14 direct the disk toward first location 34.

A first position sensor is provided adjacent to opening 47 to monitor the position of the lowermost disk 24 during its movement toward first location 34 under the influence of fingers 46. The sensor includes a photodetector 78 below and aligned with a light source 80 such that the light beam from source 80 is broken by disk 24 as it moves to the right when viewing FIG. 1. Breaking of the light beam causes a signal to be generated which controls one or more functions of apparatus 10.

Another position sensor comprised of a light source 82 and a photodetector 84 is carried in any suitable manner on support 12 and determines when the disk is in first location 34. This sensor also provides a control signal for controlling one or more functions of apparatus 10.

Even after the disk 24 is in first location 34, bar member 48 continues to move to the right when viewing FIGS. 1 and 3 through a finite distance and until the envelope of disk 24 is received between the jaws defined by parts 66 and 68 of fingers 46. When this occurs, the movement of member 48 ceases and the fingers 46 will then grasp the disk and will be ready to pull the disk out of first location 34 after completion of one or more functions.

To couple disk 24 to spindle 36, collet 38 is lowered into position and enters the central hole of the disk so as to move the disk into driving relationship with the upper end of the spindle. Means for lowering the collet include an arm 86 pivotally mounted in any suitable manner on support 12 for movement in a vertical plane. Collet 38 is coupled to arm 86 in any suitable manner and moves up and down with the pivotal movement of the arm relative to support 12.

A crank arm 88 is pivotally coupled to the outer end of arm 86 and is pivotally coupled by a pin 92 to a crank 90 secured to the drive shaft 94 of a motor 96 secured in any suitable manner to support 12. By operation of motor 96, crank 90 is rotated to cause arm 88 to raise and lower and thereby cause raising and lowering of arm 86 with collet 38 thereon. When member 48 approaches wall 14, the presence of member 48 is sensed by a photoelectric sensor 91 (FIG. 3) having a slot 93 for receiving an opaque flag 95 secured to the adjacent end of member 48. Similarly, two different sensors 97 and 98 which are in side-by-side relationship receive a flag 100 in a sequence when member 48 returns to its initial position shown in FIG. 3.

When a disk 24 is removed from first location 34, it is pulled by fingers 46 to the left when viewing FIGS. 1 and 3. In so doing, fingers 46 grasp the disk in a clothes pin fashion. Since the location of the junction of the jaws of fingers 46 is below flanges 20 of bin 18, disk 24 is, therefore. Beneath these flanges and, when the disk is above selector plate 40, the disk is released from fingers 46 and allowed to fall onto the selector plate 40 which will have been pivoted into either one of two positions, depending upon the results of the function performed when the disk was at first location 34. As shown in FIG. 2, the two positions of selector plate 40 are shown in full lines and dashed lines, respectively. Rotation of the selector plate is caused by the operation of reversible motor 98 (FIG. 1) which is mounted in any suitable manner on central wall 14 of support 12 and an intermediate wall 15 (FIG. 1). The front edge of selector plate 40 is mounted by a pivot pin 40a on wall 14.

OPERATION

In preparing apparatus 10 for operation, a stack of disks 24 is placed in bin 16 so that the lowermost disk supports the remaining disks by virtue of the lowermost disk being on flanges 20 and against flanges 22 (FIG. 3). FIG. 4 shows the stack of disks in bin 16 with the lowermost disk ready to be moved laterally of the bin and into first location 34.

Upon actuation of drive motor 62, fingers 46, under the influence of bar member 48, commence to move to the right when viewing FIGS. 1 and 3. Parts 66 of the fingers engage the rear marginal edge of the lowermost disk 24 and push the disk laterally toward first location 34 as shown in FIG. 5. Collet 38 will still be at its elevated position as shown in FIG. 5 awaiting the positioning of the lowermost disk 24 so that the collet can move downwardly and into the central hole of the disk to couple the disk to drive spindle 36 (FIG. 1).

As shown in FIG. 6, the lowermost disk 24 clears the bin 16 and the disk straightens out after being flexed slightly by the guides 87 and 89. The disk then drops downwardly so that the rear edge is approaching the entrance to the jaws defined by parts 66 and 68 of fingers 46.

Figure 7:
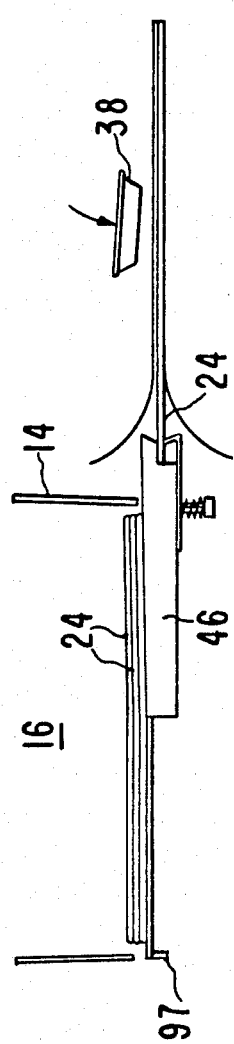

FIG. 7 shows that movement of disk 24 has stopped as the disk is centered above spindle 36. Fingers 46, however, continue to move to the right in FIG. 7 until the marginal edge of the envelope of the disk is received between the jaws of the fingers. Motor 96 is energized and collet 38 is moved downwardly to force the disk into driving relationship to the spindle.

Figure 8:
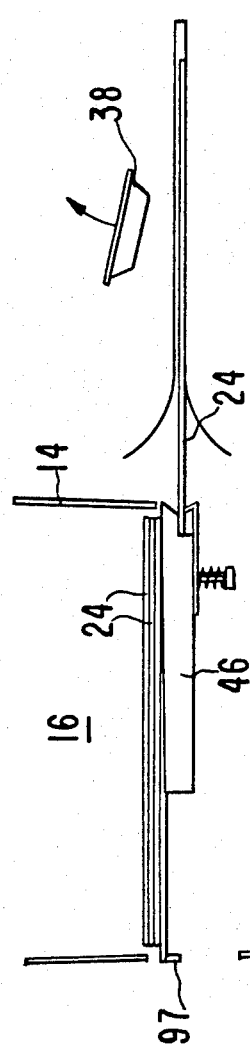
Figure 9:
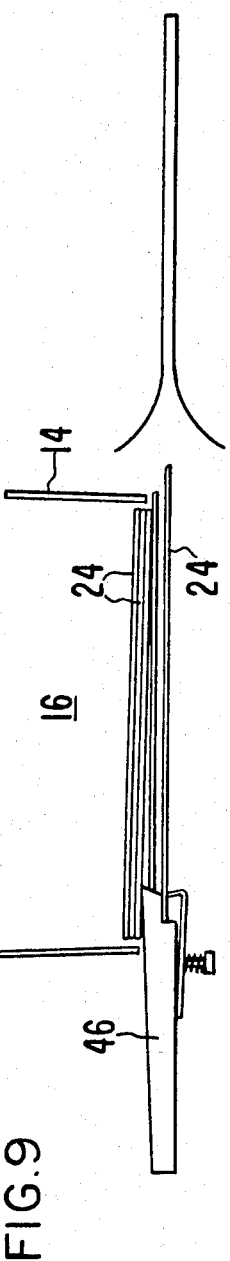
Figure 10:
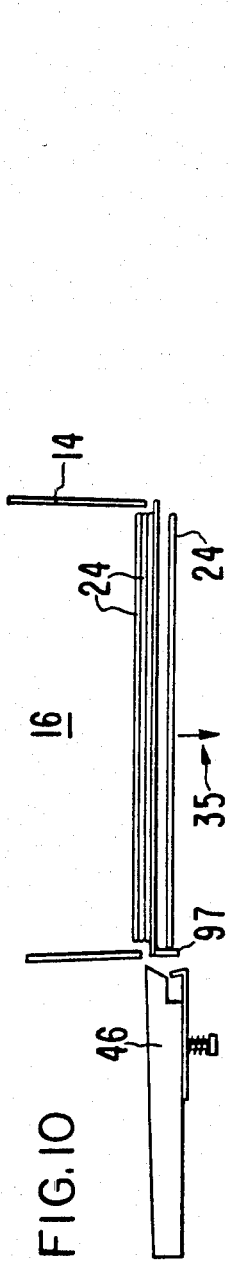

After completion of the function performed with the disk at first location 34, collet 38 is elevated by actuation of motor 96 causing arm 86 to pivot upwardly, carrying collet 38 therewith. Then, motor 62 is energized to rotate shaft 50 in the opposite direction, causing fingers 46 to pull disk 24 away from spindle 36 and to second location 35 below bin 16. FIG. 8 illustrates the pulling of the disk toward second location 35. Eventually, the fingers 46 will move the disk to second location 35 immediately below the bin and below flanges 20 of the bin, whereupon the disk will engage stops 97 below flanges 20 as fingers 46 continue to move to the left as shown in FIG. 10. When this occurs, the disk is removed from the fingers and allowed to gravitate onto selector plate 40 which will have been pivoted into either of its two operative positions shown in FIG. 2 depending upon the results of the function performed with the disk at location 34. Then, the movement of fingers 46 is sensed by sensors 96 and 98 which turns motor 62 off or starts the motor to rotate in the opposite direction, to restart the above sequence. The method of the present invention is carried out by performing the above-mentioned steps on the lowermost disk 24, then repeating the steps for each of the disks 24 until the supply of disks 24 in bin 16 has been depleted.

The present invention provides a highly reliable means of controlling the removal of disks one-by-one from a stack and moving the individual disks to a location at which the disks can be rotated, tested, written on, written from and the like. Then the system operates to return the disk to another location at which it can be directed to one of two collection stations depending upon the quality of the disk or other criteria by which the disk is measured or compared. All of the aforesaid steps are done automatically without operator attention, it being required only that an operator supply the bin 16 with disks 24 and keep the bin so supplied for generally continuous operation of system 10.

I claim:

1. Disk handling apparatus comprising: a support; means on the support for forming a bin adapted to receive a stack of disks, said bin having a lower, open end and means permitting the lowermost disk to be moved laterally of the bin as the other disks of the stack remain in the bin; means adjacent to the bin forming means for moving the lowermost disk laterally of the bin to a first location at which the lowermost disk is exteriorly of the bin, whereby at least one task can be performed with the lowermost disk, said moving means having means for shifting the lowermost disk to a second location beneath the bin and laterally of the first location, there being means for separating the disk from the moving means; means adjacent to said second location for forming a pair of collection stations; a selector plate pivotally mounted on the support at said second location; and means coupled with the selector plate for selectively pivoting the same relative to the support, whereby a separated disk can be directed to one or the other collection station as a function of the results of the task performed with the disk at said first location.

2. Apparatus as set forth in claim 1, wherein said moving means includes a finger and means mounting the finger for movement along a generally horizontal path beneath the bin.

3. Apparatus as set forth in claim 2, wherein the finger includes a pair of relatively shiftable parts defining a pair of jaws for grasping the disk when the disk is at the first location, whereby the disk can be pulled from the first location to the second location by said finger.

4. Apparatus as set forth in claim 2, wherein said moving means comprises a reversible motor., and means coupling the motor to the finger.

5. Apparatus as set forth in claim 4, wherein said coupling means includes a shaft rotatably mounted on the support, and a linear actuator movable in response to the rotation of the shaft, the finger being coupled to the linear actuator.

6. Apparatus as set forth in claim 1, wherein said bin forming means comprises a pair of spaced, generally upright walls, each wall having a bottom, generally horizontal flange for supporting the stack of disks in the bin.

7. Apparatus as set forth in claim 6, wherein said moving means comprises a finger movable in the space between the flanges and at a height sufficient to engage only the lowermost disk of the stack in the bin.

8. Apparatus as set forth in claim 1, wherein is included a rotatable spindle at said first location, a collet above the spindle, and means coupled with the collet for moving the same into engagement with the disk to couple the disk with the spindle when the disk is at the first location.

9. Apparatus as set forth in claim 1, wherein is included control means coupled with the moving means and the directing means for operating the same sequentially as a function of the position of the lowermost disk with respect to said bin.

10. A method of handling magnetic recording disks comprising: providing a plurality of disks in a stack; moving the lowermost disk laterally of the stack to a first location; rotating the disk at the first location to permit a task to be performed with the disk; shifting the disk from the first location to a second location beneath the bin; moving the lowermost disk into one of a pair of collection stations below the bin; selecting the collection station before said moving step as a function of the results of the task performed upon the rotation of the disk at said first location; and repeating the moving, rotating, shifting, moving and selecting steps for each of the remaining disks in the bin.

11. A method as set forth in claim 10, wherein said moving step includes pushing the lowermost disk laterally of the bin as the other disks in the stack remain in the bin.

12. A method as set forth in claim 10, wherein said shifting step includes pulling the lowermost disk from the first location to the second location.

13. A method as set forth in claim 12, wherein said pulling step includes grasping the disk and pulling the disk to the second location, and removing the pulling force on the disk as the disk approaches the second location.

14. A method as set forth in claim 10, wherein said rotating step includes positioning the disk above a rotatable spindle, and forcing the disk into driving engagement with the spindle.

* * * * *